US008971965B2

(12) United States Patent
Gustavsson

(10) Patent No.: US 8,971,965 B2
(45) Date of Patent: Mar. 3, 2015

(54) METHOD FOR OPERATING A COLOR DISPLAY OF A MOBILE DEVICE

(75) Inventor: Jonas Gustavsson, Malmo (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 322 days.

(21) Appl. No.: 13/545,104

(22) Filed: Jul. 10, 2012

(65) Prior Publication Data

US 2013/0040708 A1 Feb. 14, 2013

Related U.S. Application Data

(60) Provisional application No. 61/522,729, filed on Aug. 12, 2011.

(30) Foreign Application Priority Data

Aug. 12, 2011 (EP) .................................... 11006644

(51) Int. Cl.
*H04B 1/38* (2006.01)
*G09G 3/20* (2006.01)

(52) U.S. Cl.
CPC ...... *G09G 3/2003* (2013.01); *G09G 2320/0626* (2013.01); *G09G 2320/066* (2013.01); *G09G 2320/0666* (2013.01); *G09G 2360/144* (2013.01)
USPC ........................................ 455/566; 455/550.1

(58) Field of Classification Search
CPC ........................................................ H04W 4/26
USPC ............................................... 455/550.1, 566
See application file for complete search history.

(56) References Cited

U.S. PATENT DOCUMENTS

| | | | | |
|---|---|---|---|---|
| 7,348,957 | B2 * | 3/2008 | Cui et al. | 345/102 |
| 2002/0163524 | A1 | 11/2002 | Dutta | |
| 2006/0055639 | A1 | 3/2006 | Yamada | |
| 2006/0152525 | A1 | 7/2006 | Woog | |
| 2007/0018919 | A1 | 1/2007 | Zavracky | |
| 2011/0072378 | A1 * | 3/2011 | Nurminen et al. | 715/771 |
| 2012/0220260 | A1 * | 8/2012 | Bandera et al. | 455/405 |

FOREIGN PATENT DOCUMENTS

| | | | |
|---|---|---|---|
| EP | 1 918 906 | A2 | 5/2008 |
| GB | 2 391 995 | A | 2/2004 |

OTHER PUBLICATIONS

Extended European Search Report and Opinion, corresponding to EP 11 00 6644, date of completion Jan. 20, 2012.

* cited by examiner

*Primary Examiner* — Amancio Gonzalez
(74) *Attorney, Agent, or Firm* — Renner, Otto, Boisselle & Sklar, LLP

(57) ABSTRACT

A method for operating a color display of a mobile device is provided. According to the method, a usage condition of the mobile device is detected and based on the detected usage condition a color scheme of information displayed on the color display is automatically adapted.

9 Claims, 2 Drawing Sheets

METHOD FOR OPERATING A COLOR DISPLAY OF A MOBILE DEVICE

FIELD OF THE INVENTION

The present invention relates to a method for operating a color display of a mobile device, and a mobile device comprising a color display.

BACKGROUND OF THE INVENTION

Mobile devices, for example mobile phones, smartphones, mobile navigation systems and mobile media player, are omnipresent and therefore used in nearly every kind of environment at any time of the day. Therefore, mobile devices may be used at a large variety of environmental lighting conditions, for example in bright sunlight, at night, during twilight, inside a building or a vehicle, or outside.

Therefore, it is an object of the present invention to ensure an appropriate readability and perceptibility of information output on a display of a mobile device under various lighting conditions.

SUMMARY OF THE INVENTION

According to the present invention, this object is achieved by a method for operating a color display of a mobile device as defined in claim 1, and a mobile device as defined in claim 9. The dependent claims define preferred and advantageous embodiments of the invention.

According to an aspect of the present invention, a method for operating a color display of a mobile device is provided. According to the method, a usage condition of a mobile device is detected, and based on the detected usage condition a color scheme of information displayed on the color display is automatically adapted. Due to the structure of the human eye different kinds of vision may be distinguished, for example scotopic vision as a vision under very dim levels of illumination, photopic vision for a vision at higher illumination levels, and mesopic vision for a vision where the level of illumination is equivalent to twilight or dusk. A spectral susceptibility of the human eye is different at each kind of vision. For example, at scotopic vision the human eye is highly sensitive for blue colors having a wavelength of 500 nm or less and is nearly not sensitive to red light having a wavelength larger than 640 nm. In contrast, at photopic vision, the human eye is highly sensitive to yellow and green colors around 550 nm and also very sensitive to wavelengths greater than about 640 nm, the red portion of the visible spectrum. Furthermore, the human eye needs time to adapt from a bright illumination to a dark illumination. This so called “dark adaption” may take several minutes or even more. Therefore, detecting a usage condition of the mobile device, for example a light intensity in an environment of the mobile device, and automatically adapting a color scheme of the information displayed on the mobile device accordingly may increase the perceptibility of the information and may thus optimize the use of the mobile device.

According to an embodiment, a brightness of the information displayed on the color display may be automatically adapted based on the detected usage condition. Detecting the usage condition may comprise for example detecting a light intensity in an environment of the mobile device. The brightness of the information displayed on the color display may be adapted such that the brightness decreases with a decreasing light intensity. For example, the brightness may be lowered in a dark environment and may be increased in a brighter environment. Thus, a power consumption for illuminating the color display may be reduced and battery power of a battery of the mobile device may be saved. Furthermore, by lowering the brightness in dark environments, it may be avoided that a night vision or dark adaption of the eyes of a user is destroyed. Furthermore, by increasing the brightness in bright environments, a legibility of information displayed on the color display can be increased. Adapting the brightness of the information displayed on the color display based on the detected usage condition may be performed independently from the above described adaption of the color scheme, or may be performed in combination with the color scheme adaption.

According to another embodiment, a contrast of the information displayed on the color display is automatically adapted based on the detected usage condition. For example, detecting the usage condition of the mobile device may comprise detecting a light intensity in an environment of the mobile device. Then, adapting the contrast may comprise increasing the contrast of the information displayed on the color display with increasing light intensity. This means that a high contrast is used in bright environments and a low contrast is used in dark environments. Adapting the contrast of the information displayed on the color display based on the detected usage condition may be performed independently from the automatic adaption of the color scheme defined above, or in combination.

According to yet another embodiment, detecting the usage condition of the mobile device comprises a detecting of a light intensity in an environment of the mobile device, a detection of a time of day when the mobile device is used, or a detection of a kind of an application whose information is currently displayed on the color display. As described above, using the light intensity in the environment of the mobile device may be advantageously used to adapt the color scheme, the brightness or the contrast automatically. However, also a time of day information may be used to automatically adapt the color scheme, the brightness or the contrast, assuming for example that the mobile device is used in a bright environment during a daytime and in a darker environment during a nighttime. Thus, the color scheme, the brightness or the contrast may be adapted accordingly. Furthermore, it may be advantageous to take into account the kind of application whose information is currently displayed on the color display. For example, when an image editing application is running on the mobile device an automatic adaption of a color scheme, a brightness or a contrast may be avoided, as a change of the color scheme, the brightness or the contrast may disturb or irritate a user editing an image. On the other hand, when a word processing application, an e-mail application, a telephone application or a gaming application is currently processed on the mobile device and information of this application is displayed on the color display, an automatic adaption of the color scheme, brightness and contrast may help to increase the legibility of the displayed information.

According to another embodiment, the color scheme may be automatically adapted by selecting a color scheme from a lookup table based on the detected usage condition and applying the selected color scheme to the information displayed on the color display. Thus, for certain predefined applications and usage conditions, for example a bright environment, a dark environment, and a twilight environment, predefined color schemes may be provided in the lookup table and an appropriate color scheme may be automatically selected and applied based on the detected usage condition, for example based on a detected light intensity in an environment of the mobile device. A color scheme may comprise for example a color translation table for translating color values of an application into color values which will be displayed on the color display.

According to a further embodiment, for detecting the usage condition of the mobile device a light intensity in an environment of the mobile device is detected and the color scheme is adapted in at least one of the following ways:

- A wavelength of at least one color of the information displayed on the color display is increased with a decreasing light intensity. By increasing a wavelength of a color the color may be shifted from a scotopic sensitive wavelength to a photopic sensitive wavelength of the eye of the user. Therefore, when the eyes of the user are adapted to darkness, this dark adaption may not be destroyed by the information displayed in colors in the photopic sensitive wavelength range.
- A wavelength of at least one color of the information displayed on the color display may be decreased with an increasing light intensity. This is the reverse effect of the above-described increasing of the wavelength with a decreasing light intensity.
- At least one color of the information displayed on the color display is shifted from a blue spectrum to a red or green spectrum with a decreasing light intensity. To avoid a destruction of night vision when the user's eyes are adapted to darkness, bright light in a blue spectrum should be avoided. Therefore, blue colors may be shifted to red or green colors to avoid this effect in dark environments. For example, when the mobile device is operated in a vehicle at night, bright light in a blue spectrum from the mobile device may disturb a dark adaption of the eyes of the user. Displaying the information in a red or green spectrum does not influence the dark adaption and thus the user's eyes remain adapted to the darkness which may increase driving safety.
- At least one color of the information displayed on the color display is shifted from a red spectrum to a green or blue spectrum with an increasing light intensity. Again, this is the reverse effect of the above-described shift from blue to red or green.
- A color saturation of the information displayed on the color displayed is decreased with an increasing light intensity. In bright environments low contrasts are difficult to be distinguished by the human eye. By decreasing in this situation the color saturation and thus limiting the color spectrum, a contrast may be increased which may help to increase the legibility under difficult bright and environmental conditions.
- A black and white representation of the information on the color display is displayed, when the light intensity exceeds a predetermined threshold. In very bright environments the previously described adaption of decreasing the color saturation is escalated to a complete color desaturation ending in a black and white representation of the information. For example, when the color display is exposed to direct sunlight, a black and white representation or a representation with only a few grayscales may deliver a good legibility.

According to another aspect of the present invention, a mobile device is provided. The mobile device comprises a color display adapted to display information to a user of the mobile device, and a processing unit. The processing unit is coupled to the color display and adapted to detect a usage condition of the mobile device and is furthermore configured to adapt a color scheme of the information displayed on the color display based on the detected usage condition automatically. Furthermore, the mobile device may be adapted to perform the above-described method or embodiments of the above-described method and comprises therefore the above-described advantages.

The mobile device may be a mobile phone, a personal digital assistant, a mobile music player, a mobile computer or a mobile navigation system.

Although specific features described in the above summary and the following detailed description are described in connection with specific embodiments, it is to be understood that the features of the embodiments may be combined with each other unless specifically noted otherwise. Furthermore, it is to be understood that the above-described features may be used independently from each other, for example the automatic adaption of the brightness of the information displayed on the color display based on the detected usage condition may be used independently from the automatic adaption of the color scheme or the automatic adaption of the contrast. In the same way, the automatic adaption of the contrast of the information displayed on the color display based on the detected usage condition may be used independently from the automatic adaption of the color scheme or the automatic adaption of the brightness.

BRIEF DESCRIPTION OF THE DRAWINGS

The invention will now be described in more detail with reference to the accompanying drawings.

DETAILED DESCRIPTION OF PREFERRED EMBODIMENTS

In the following, exemplary embodiments of the present invention will be described in more detail. It has to be understood that the following description is given only for the purpose of illustrating the principles of the invention and is not to be taken in a limiting sense. Rather, the scope of the invention is defined only by the appended claims and is not intended to be limited by the exemplary embodiments hereinafter.

It is to be understood that the features of the various exemplary embodiments described herein may be combined with each other unless specifically noted otherwise. Furthermore, any direct coupling of functional units or components in the embodiments shown in the figures or described in the following detailed description may also be realized as an indirect coupling.

Figure 1:
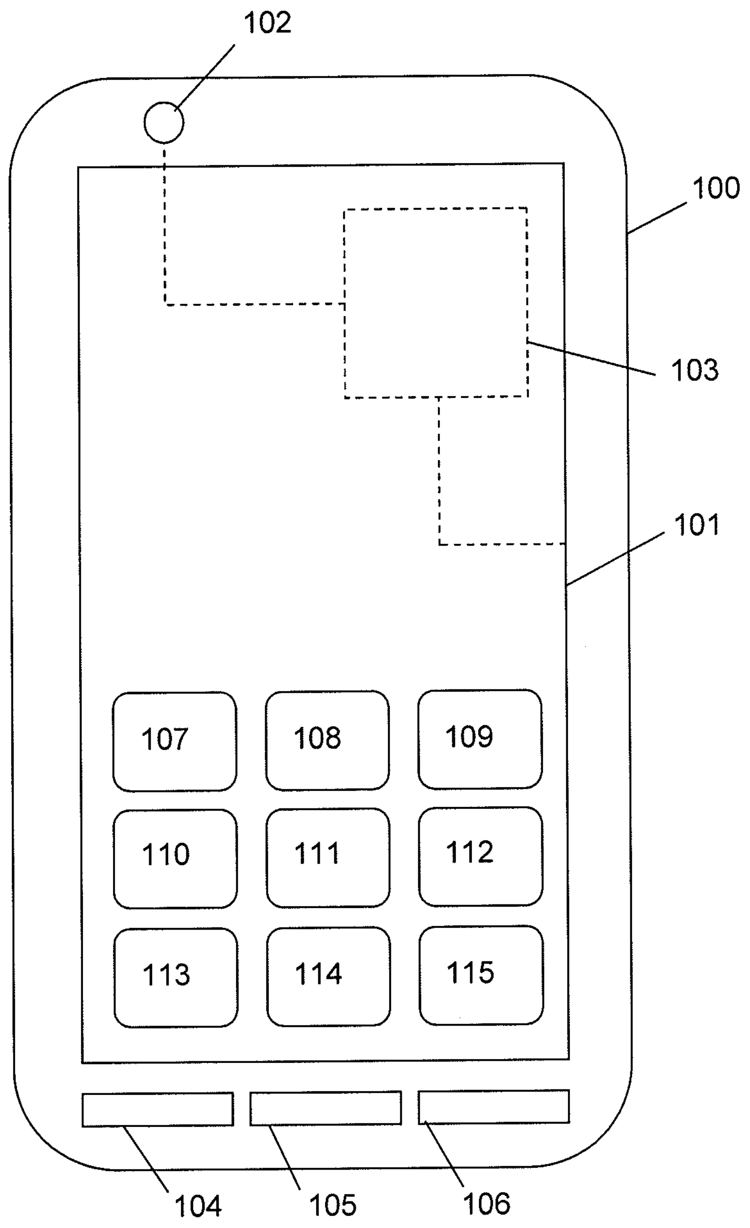
FIG. 1 shows schematically a mobile device according to an embodiment of the present invention.

FIG. 1 shows a mobile device 100 comprising a color display 101, a brightness sensor 102, a processing unit 103 and control knobs 104-106. The processing unit 103 is coupled to the brightness sensor 102 and the color display 101. The color display 101 may comprise a touch sensitive surface such that the color display 101 constitutes a so called touch screen. The color display 101 may be configured to display components of a graphical user interface including textual and graphical information and control areas 107-115 for receiving input information from a user via the touch sensitive surface. The color display 101 may further be configured to display media content, for example videos or images. The mobile device 100 may contain a lot more components, for example a microphone, a loudspeaker, a radio frequency transceiver for a mobile telephone and data communication, and a battery for powering the mobile device 100 but these components are not shown in FIG. 1 for clarity reasons.

In operation the processing unit 103 may be adapted to detect a usage condition of the mobile device. The usage condition may be detected for example by detecting a light intensity with the brightness sensor 102 of an environment of the mobile device 100. Based on the detected usage condition, for example a usage of the mobile device 100 in bright sunlight, in a dark environment at night or in an environment with a medium illumination in a building or a vehicle, the processing unit may automatically adapt a color scheme of the information displayed on the color display 101. In the following, a short introduction of the functioning of the human eye will be given and based on this some exemplary color scheme adaptions which may be performed by the processing unit 103 will be described in more detail.

The following explanations are based on the Article "The Eye and Night Vision" of the "American Optomeric Association" which has been adapted from the USAF Special Report, AL-SR-1992-0002, "Night Vision Manual for the Flight Surgeon", written by Robert E. Miller II, Col, USAF and Thomas J. Tredici, Col, USAF. The retina of a human eye contains receptor cells, rods and cones, which, when stimulated by light, send signals to the brain. These signals are subsequently interpreted as vision. Although there are approximately 17 rods for every cone, the cones, concentrated centrally, allow resolution of fine detail and color discrimination. The rods cannot distinguish colors and have poor resolution, but they have much higher sensitivity to light than the cones. According to a widely held theory of vision, the rods are responsible for vision under very dim levels of illumination (scotopic vision) and the cones function at higher illumination levels (photopic vision). Photopic vision provides the capability for seeing color and resolving fine detail but it functions only in good illumination. Scotopic vision is of poorer quality. It is limited by reduced resolution and provides the ability to discriminate only between shades of black and white. However, both rods and cones function over a wide range of light intensity levels and, at intermediate levels of illumination, they function simultaneously. The transition zone between photopic and scotopic vision where the level of illumination is equivalent to twilight or dusk, is called mesopic vision.

Cones and rods differ additionally in dark adaption. Dark adaption is an independent process during which each eye adjusts from a high-luminance setting to a low-luminance setting. The fully dark-adapted eye restores retinal sensitivity to its maximum level. Cones attain maximum sensitivity in 5-7 minutes, while rods require 30-35 minutes or longer of absolute darkness to attain maximum sensitivity after exposure to bright light. Furthermore, rods and cones are not equally sensitive to visible wavelengths of light. The part of electromagnetic energy spectrum which stimulates the receptor cells in the retina is known as visible light. Visible light includes for example violet, blue, green, yellow, orange and red, i.e., a range of wavelengths extending from about 380 nm to 760 nm. Unlike the cones, the rods are more sensitive to blue light and are not sensitive to wavelengths greater than about 640 nm. This leads to the so called Purkinje shift. The Purkinje shift is the relatively greater brightness of blue or green light, compared with yellow or red light, upon shifting from photopic to scotopic adaption. For example, in a darkened room, if a person looks at two dim lights of equal illumination (one red and one green) that are positioned closely together, the red light will look brighter than the green light when the eyes are fixating centrally. If one looks to the side of the dim lights about 15-20 degrees, the green light will appear brighter than the red. Central fixation involves the cones and photopic vision while fixation excentrally involves rods and scotopic vision. The cones are more sensitive to yellow and red, but the rods are more sensitive to light of blue and green wavelengths.

A color, brightness or contrast adaption for information displayed on the color display 101 can be conducted to create a more pleasing user interface in different illumination conditions. Furthermore, electrical power of the battery of the mobile device 100 may be saved due to a lower backlight illumination of the color display 101 in certain illumination conditions.

Figure 2:
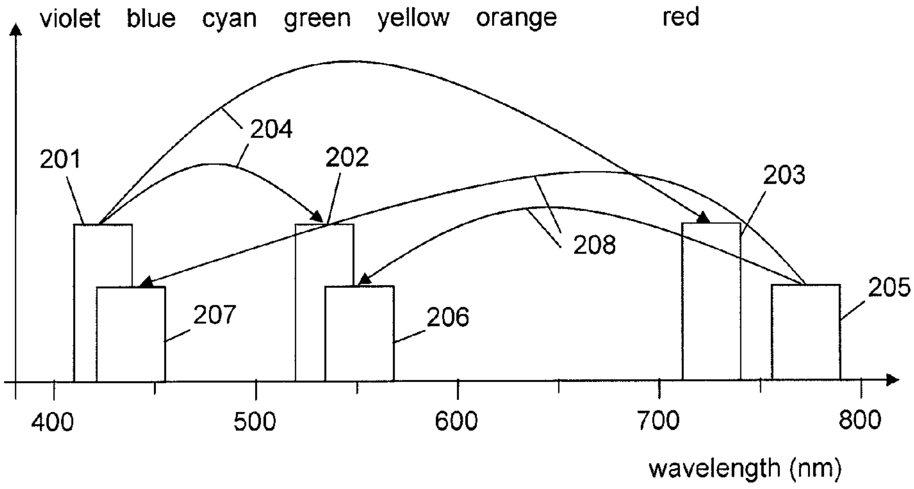
FIG. 2 shows color shifts according to an embodiment of the present invention in a visible spectrum.

FIG. 2 shows the spectrum of visible light. An information displayed on the color display 101 may comprise for example a spectrum 201 in the violet and blue wavelength range. When the processing unit 103 detects, for example via the brightness sensor 102, that the mobile device 100 is operate in a dark environment, colors in the blue and violet spectrum should be avoided to avoid destruction of night vision of the user. Therefore, the spectrum 201 may be shifted to a green spectrum 202 or a red spectrum 203 as indicated by arrows 204.

According to another exemplary embodiment, the information displayed on the color display 101 may comprise the spectrum 205 in the red wavelength range. When the processing unit 103 detects that the mobile device 100 is operated in a bright environment, for example, in direct sunlight, the spectrum 205 may be additionally established in a green spectrum 206 and a blue spectrum 207 for the information to be output on the color display 101 such that the information appears as a bright or white information indicated by arrows 208. Additionally, the background could be darkened or tinted in black. This increases the contrast and legibility of the information.

Furthermore, when a dark environment is detected, the brightness of the color display 101 may be lowered which may increase the visibility of the information displayed on the color display 101 and which may reduce the power consumed by a backlight of the color display 101. Furthermore, in bright environments, especially in direct sunlight, the color spectrum may be limited to saturated colors or black and white representations and at the same time the brightness and the contrast may be increased.

To sum up, the color correction and the management of brightness and contrast may be implemented such that the user interface is tinted towards a color spectrum that is least problematic to the human eye such as desaturated red/yellow and green in dark environments and blue/green in light environments.

Measuring of light conditions can be done various ways, such as by the brightness sensor 102, a time of day on the mobile device 100, contextual information depending on tasks like media playback and image editing. For example, if a true color reproduction is important on the screen when media like a video is played back or an image is displayed or edited, a user interface additionally displayed on the color display 101 should have a low brightness and icons and buttons should have a low color saturation to limit vision based color bleed. This may widen the perceived contrast ratio of the color display 101.

Finally, it is to be understood that all the embodiments described above are considered to be comprised by the present invention as it is defined by the appended claims.

The invention claimed is:

1. A method for operating a color display of a mobile device, the method comprising:

detecting a usage condition of the mobile device, and automatically adapting a color scheme of information displayed on the color display based on the detected usage condition, wherein detecting the usage condition of the mobile device comprises detecting a light intensity in an environment of the mobile device, and wherein adapting the color scheme comprises at least one of:

increasing a wavelength of at least one color of the information displayed on the color display with a decreasing light intensity, shifting of at least one color of the information displayed on the color display from a blue spectrum to a red or green spectrum with a decreasing light intensity, decreasing a wavelength of at least one color of the information displayed on the color display with an increasing light intensity, shifting of at least one color of the information displayed on the color display from a red spectrum to a green or blue spectrum with an increasing light intensity, decreasing a color saturation of the information displayed on the color display with an increasing light intensity, or displaying a black and white representation of the information on the color display when the light intensity exceeds a predetermined threshold.

2. The method according to claim 1, further comprising:

automatically adapting a brightness of the information displayed on the color display based on the detected usage condition.

3. The method according to claim 2, wherein detecting the usage condition of the mobile device comprises detecting a light intensity in an environment of the mobile device, and wherein adapting the brightness comprises decreasing the brightness of the information displayed on the color display with a decreasing light intensity.

4. The method according to claim 1, further comprising:

automatically adapting a contrast of the information displayed on the color display based on the detected usage condition.

5. The method according to claim 4, wherein detecting the usage condition of the mobile device comprises detecting a light intensity in an environment of the mobile device, and wherein adapting the contrast comprises increasing the contrast of the information displayed on the color display with an increasing light intensity.

6. The method according to claim 1, wherein detecting the usage condition of the mobile device comprises at least one of a group comprising:

detecting a light intensity in an environment of the mobile device, detecting a time of day, and detecting a kind of an application whose information is displayed on the color display.

7. The method according to claim 1 wherein adapting the color scheme comprises:

selecting a color scheme from a look-up table based on the detected usage condition, and applying the selected color scheme to the information displayed on the color display.

8. A mobile device comprising:

a color display adapted to display information to a user of the mobile device, a processing unit, coupled to the color display and adapted to detect a usage condition of the mobile device and automatically adapt a color scheme of the information displayed on the color display based on the detected usage condition, wherein the processing unit is adapted to detect the usage condition of the mobile device by detecting a light intensity in an environment of the mobile device, and wherein the processing unit is adapted to adapt the color scheme by at least one of:

increasing a wavelength of at least one color of the information displayed on the color display with a decreasing light intensity, shifting at least one color of the information displayed on the color display from a blue spectrum to a red or green spectrum with a decreasing light intensity, decreasing a wavelength of at least one color of the information displayed on the color display with an increasing light intensity, shifting at least one color of the information displayed on the color display from a red spectrum to a green or blue spectrum with an increasing light intensity, decreasing a color saturation of the information displayed on the color display with an increasing light intensity, or displaying a black and white representation of the information on the color display when the light intensity exceeds a predetermined threshold.

9. The mobile device according to claim 8, wherein the mobile device comprises at least one mobile device of a group consisting of a mobile phone, a personal digital assistant, a mobile music player, a mobile computer, and a mobile navigation system.

* * * * *